United States Patent
Kim et al.

(10) Patent No.: US 9,311,525 B2
(45) Date of Patent: Apr. 12, 2016

(54) METHOD AND APPARATUS FOR ESTABLISHING CONNECTION BETWEEN ELECTRONIC DEVICES

(71) Applicant: QUALCOMM Incorporated, San Diego, CA (US)

(72) Inventors: Kang Kim, Seoul (KR); Min-Kyu Park, Seoul (KR); Yongwoo Cho, Seoul (KR); Kyu Woong Hwang, Taejon (KR); Duck-Hoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/219,894

(22) Filed: Mar. 19, 2014

(65) Prior Publication Data

US 2015/0269420 A1 Sep. 24, 2015

(51) Int. Cl.
*G06K 9/62* (2006.01)
*G06K 9/00* (2006.01)
*G06F 21/32* (2013.01)
*G10L 17/00* (2013.01)
*H04L 29/06* (2006.01)
*H04L 29/08* (2006.01)
*H04W 12/06* (2009.01)
*G10L 15/00* (2013.01)

(52) U.S. Cl.
CPC .......... *G06K 9/00268* (2013.01); *G06F 21/32* (2013.01); *G06K 9/00221* (2013.01); *G10L 17/005* (2013.01); *H04L 63/0861* (2013.01); *H04L 67/10* (2013.01); *H04W 12/06* (2013.01); *G10L 15/00* (2013.01)

(58) Field of Classification Search
None
See application file for complete search history.

(56) References Cited

U.S. PATENT DOCUMENTS

| 6,339,706 | B1 | 1/2002 | Tillgren et al. | |
|---|---|---|---|---|
| 2009/0286479 | A1 | 11/2009 | Thoresson et al. | |
| 2011/0002680 | A1* | 1/2011 | Narasimha et al. | 396/124 |
| 2011/0047384 | A1 | 2/2011 | Jacobs et al. | |
| 2011/0244829 | A1* | 10/2011 | Kase | 455/411 |
| 2012/0294495 | A1 | 11/2012 | Wren et al. | |
| 2013/0117834 | A1 | 5/2013 | Ishioka | |
| 2013/0121541 | A1 | 5/2013 | Hwang | |
| 2014/0368679 | A1* | 12/2014 | Fujinawa et al. | 348/211.2 |

FOREIGN PATENT DOCUMENTS

WO 2014/031652 A1 2/2014

OTHER PUBLICATIONS

Ransiri, Shanaka, et al., SmartFinger: An Augmented Finger as a Seamless 'Channel' between Digital and Physical Objects, 4th Augmented Human International Conference (AH'13), Mar. 7-8, 2013, 4 pages, Stuttgart, Germany.

(Continued)

*Primary Examiner* — Brian P Werner
(74) *Attorney, Agent, or Firm* — Toler Law Group, PC

(57) ABSTRACT

A method, performed in an electronic device, for connecting to a target device is disclosed. The method includes capturing an image including a face of a target person associated with the target device and recognizing an indication of the target person. The indication of the target person may be a pointing object, a speech command, and/or any suitable input command. The face of the target person in the image is detected based on the indication and at least one facial feature of the face in the image is extracted. Based on the at least one facial feature, the electronic device is connected to the target device.

28 Claims, 12 Drawing Sheets

(56) References Cited

OTHER PUBLICATIONS

Pavlovic, Vladimir I., et al., "Visual Interpretation of Hand Gestures for Human-Computer Interaction: A Review", Alysis and Machine Intelligence, vol. 19, No. 7, Jul. 1997, 20 pages.

Partial International Search Report—PCT/US2015/020710—ISA/EPO—Jul. 16, 2015, 8 pages.

Bourdev L., et al., "Describing people: A Poselet-based Approach to Attribute Classification", Computer Vision (ICCV), 2011 IEEE International Conference On, IEEE, Nov. 6, 2011, pp. 1543-1550, XP032101366, DOI: 10.1109/ICCV.2011.6126413 ISBN: 978-1-4577-1101-5 the whole document.

International Searcdh Report and Written Opinion—PCT/US2015/020710—ISA/EPO—Dec. 11, 2015.

Jungseok J., et al., "Human Attribute Recognition by Rich Appearance Dictionary", 2013 IEEE International Conference On Computer Vision, IEEE, Dec. 1, 2013, pp. 721-728, XP032572760, ISSN: 1550-5499, DOI: 10.1109/ICCV.2013.95 [retrieved on Feb. 28, 2014] the whole document.

Sugiyama O., et al., "An Attention Sharing Model Utilizing Pointing Gesture and Reference Term", Jan. 1, 2006, XP055232898, Retrieved from the Internet: URL: http://www.irc.atr.jp/ieice_nwr/pdf/NR-TG-2-08.pdf- [retrieved on Dec. 2, 2015] the whole document.

* cited by examiner

METHOD AND APPARATUS FOR ESTABLISHING CONNECTION BETWEEN ELECTRONIC DEVICES

TECHNICAL FIELD

The present disclosure relates to communication between electronic devices, and more specifically, to establishing a connection between an electronic device and a target device.

BACKGROUND

In recent years, the use of electronic devices such as smart glasses, smartphones and tablet computers has increased rapidly. Such electronic devices often include wireless communication functions to allow communication with other electronic devices, communication networks, servers, etc. For example, conventional electronic devices may communicate using various wireless communication technologies such as Wi-Fi, CDMA (Code Division Multiple Access), GSM (Global System for Mobile communication), GSM2000, LTE (Long-Term Evolution), LTE-Advanced, etc. Further, such electronic devices may also communicate with another device using various short-range wireless communication technologies such as Bluetooth, Wi-Fi Direct, LTE Direct, NFC (Near Field Communication), and the like.

For communication with another electronic device, a conventional electronic device often performs a pairing process with another electronic device to establish a connection according to a communication protocol common to both of the devices. For example, a pair of electronic devices may be paired with each other using a Bluetooth pairing scheme to establish a connection and then communicate with each other using the Bluetooth communication technology. However, conventional pairing methods generally require a number of steps to establish a connection between the electronic devices.

Performing a number of steps to establish a connection with another electronic device may be inconvenient to users of electronic devices. For instance, a user of an electronic device may be required to select an electronic device from a list of electronic devices that are available for connection. However, the list may not provide sufficient information to uniquely identify other electronic devices and the user may need to obtain more information to identify a desired electronic device in the list. After the desired electronic device has been identified, the user of the electronic device may also be required to enter an identification code such as a PIN (Personal Identification Number), a password, or the like to connect to another device. Thus, users of conventional electronic devices may be discouraged from communicating with other devices through such pairing steps.

SUMMARY

The present disclosure relates to establishing a connection between an electronic device and a target device.

According to one aspect of the present disclosure, a method, performed in an electronic device, for connecting to a target device, is disclosed. The method includes capturing an image including a face of a target person associated with the target device and recognizing an indication of the target person. Based on the indication, the face of the target person in the image is detected and at least one facial feature of the face in the image is extracted. The electronic device is connected to the target device based on the at least one facial feature. This disclosure also describes an apparatus, a device, a combination of means, and a computer-readable medium relating to this method.

According to another aspect of the present disclosure, an electronic device for connecting to a target device is disclosed. The electronic device includes an image sensor configured to capture an image including a face of a target person associated with the target device, and a target identifying unit configured to extract at least one facial feature of the face in the image by recognizing an indication of the target person and detecting the face of the target person in the image based on the indication. The electronic device also includes a connection controller configured to establish a connection to the target device based on the at least one facial feature.

BRIEF DESCRIPTION OF THE DRAWINGS

Embodiments of the inventive aspects of this disclosure will be understood with reference to the following detailed description, when read in conjunction with the accompanying drawings. illustrates a wearable computer configured to generate a search query in response to a speech query from a user seeking information for a shirt on a magazine

DETAILED DESCRIPTION

Reference will now be made in detail to various embodiments, examples of which are illustrated in the accompanying drawings. In the following detailed description, numerous specific details are set forth in order to provide a thorough understanding of the inventive aspects of this disclosure. However, it will be apparent to one of ordinary skill in the art that the inventive aspects of this disclosure may be practiced without these specific details. In other instances, well-known methods, procedures, systems, and components have not been described in detail so as not to unnecessarily obscure aspects of the various embodiments.

Figure 1:
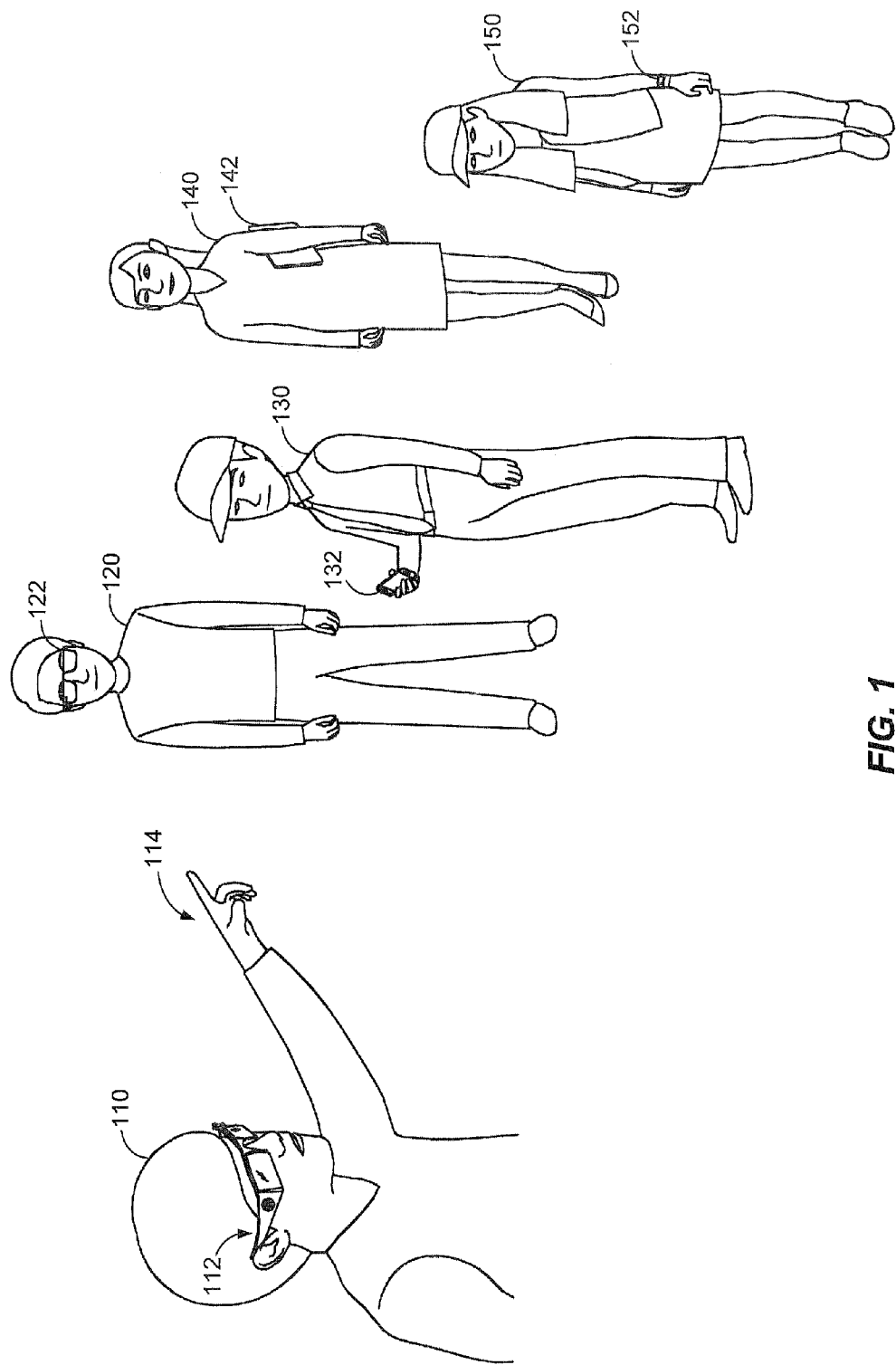
FIG. 1 illustrates an electronic device of a user that is configured to connect to a target device of a target person based on a pointing gesture of the user, according to one embodiment of the present disclosure.

FIG. 1 illustrates an electronic device 112 of a user 110 that is configured to connect to any of a plurality of electronic devices 122, 132, 142, and 152 based on a pointing gesture of the user 110, according to one embodiment of the present disclosure. As used herein, the term "gesture" may be any movement or position of a person's finger, hand, arm, or body, or an object associated with the person's finger, hand, arm, or body. As shown, a plurality of persons 120, 130, 140, and 150 are located within a field of view of the electronic device 112, which is illustrated as smart glasses. The persons 120, 130, 140, and 150 are equipped with the electronic devices 122, 132, 142, and 152, respectively, which are depicted as smart glasses, a mobile phone, a tablet computer, and a smart watch, respectively. Although the electronic devices 112, 122, 132, 142, and 152 are described as above, they may be any suitable electronic devices equipped with sound and image capturing and processing capabilities and can be worn, carried, or used by a person.

In the illustrated embodiment, the user 110 may select any of the persons 120, 130, 140, and 150 as a target person for establishing a connection between the electronic device 112 and the electronic devices 122, 132, 142, and 152. For example, the user 110 may make a pointing gesture using his or her hand as a pointing object 114 to indicate the person 120 as the target person, and the electronic device 112 may capture an image of the pointing gesture including the user's hand as the pointing object 114 and at least the target person 120 among the persons 120, 130, 140, and 150. As used herein, the term "pointing object" may be any object that can be used to indicate a target and include a person's finger, hand, arm, or body, or an object associated with the person's finger, hand, arm, or body.

From the captured image, the electronic device 112 may recognize the pointing object 114 of the user's hand as an indication of the target person 120. As used herein, the term "indication" refers to any information or data representation of a pointing object, a speech command, an input command, or the like that indicates, identifies, or describes a target. A face of the target person 120 may be detected in the captured image based on the indication using any suitable object detection methods. For example, the object detection methods may use holistic detection, part-based detection, patch-based detection, decision trees, boosting, neural networks, support vector machines, and the like. In addition, a set of facial features of the target person 120 may be extracted from the detected face in the image using any suitable feature extraction methods. For example, the feature extraction methods may use neural networks, bag of visual words, SIFT (scale-invariant feature transform), SURF (speeded-up robust features), histogram of oriented gradients, and the like. As used herein, the term "set" refers to one or more data or items, and may include a vector representation of such data or items.

The electronic devices 112, 122, 132, 142, and 152 are configured to wirelessly communicate using any suitable wireless communication technologies such as Bluetooth, Wi-Fi Direct, LTE Direct, NFC (Near Field Communication), IR (infrared) communication technology, and the like. In the illustrated embodiment, the electronic device 112 may transmit a connection request to the electronic devices 122, 132, 142, and 152, for example, by broadcasting or multicasting the connection request. The connection request may include the extracted set of facial features of the target person 120 and identification information of the electronic device 112 such as a product identification number, a MAC address, an IP address, and the like.

The electronic devices 122, 132, 142, and 152 may be configured to receive the connection request from the electronic device 112 and verify whether the received set of facial features is indicative of the associated persons 120, 130, 140, and 150, respectively. For verifying the received set of facial features, the electronic devices 122, 132, 142, and 152 may store a set of facial features for the persons 120, 130, 140, and 150, respectively. Upon receiving the connection request, each of the electronic devices 122, 132, 142, and 152 may verify whether it is an intended recipient of the connection request (i.e., a target device) by comparing the received set of facial features with the stored set of facial features.

In the illustrated embodiment, the electronic device 122 of the target person 120 (i.e., a target device in this embodiment) may determine that the received set of facial features is indicative of the target person 120 and respond to the connection request by transmitting a response message to the electronic device 112. In one embodiment, the response message may indicate that the electronic device 122 accepts the connection request. The response message may include identification information of the electronic device 122 such as a product identification number, a MAC address, an IP address, and the like. In addition, the electronic device 122 may use the received identification information of the electronic device 112 as a destination address in the response message. When the electronic device 112 receives the response message accepting the connection request, a communication connection between the electronic devices 112 and 122 may be established by any suitable wireless connection processes including, but not limited to, pairing.

Figure 2:
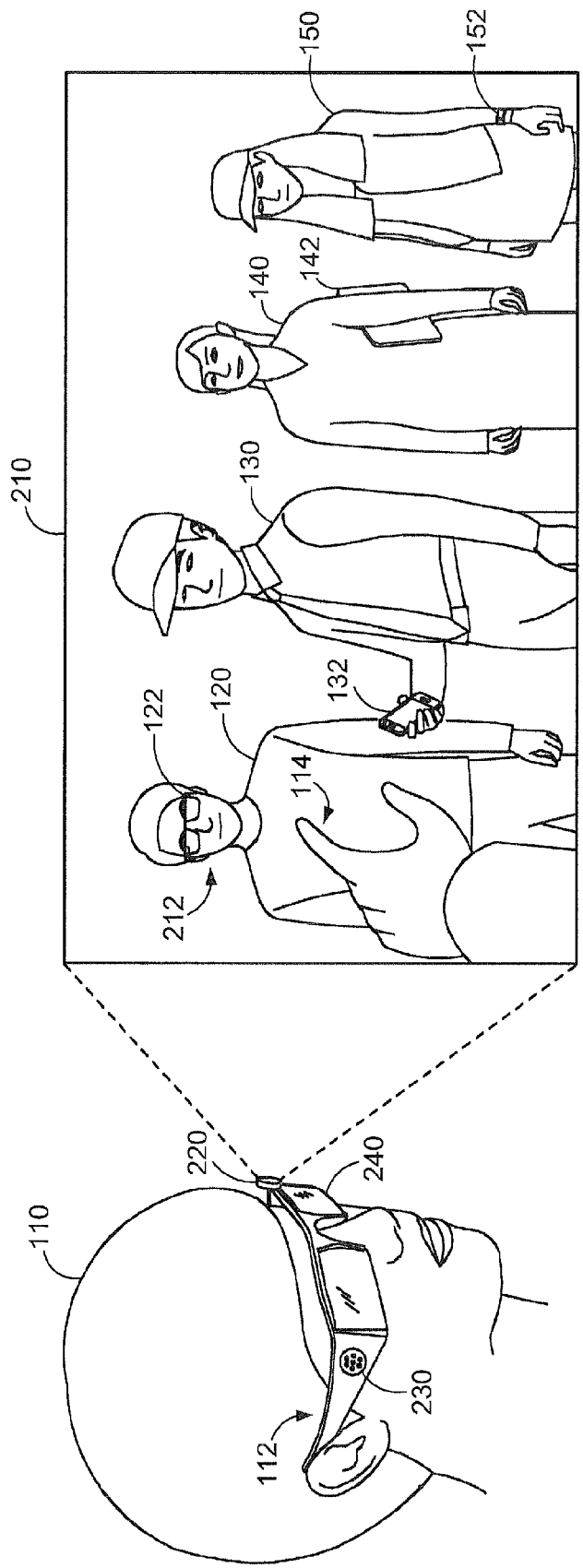
FIG. 2 illustrates an electronic device configured to detect a face of a target person in an image based on a pointing object indicating the target person, according to one embodiment of the present disclosure.

FIG. 2 illustrates the electronic device 112 configured to detect a face 212 of the target person 120 in an image 210 based on the pointing object 114 indicating the target person 120, according to one embodiment of the present disclosure. As shown, the electronic device 112 is illustrated as smart glasses equipped with an image sensor 220, a sound sensor 230, and optical lenses 240. In some embodiments, the smart glasses may be implemented without the optical lenses 240. The image sensor 220 and the sound sensor 230 are configured to capture images and sounds, respectively. The smart glasses may also include a display unit (not shown) configured to display or project images detected by the image sensor 220 and other information for the user 110.

In the illustrated embodiment, the user 110 of the electronic device 112 may look at the persons 120, 130, 140, and 150 and make the pointing gesture to indicate the target person 120 by using the pointing object 114 (e.g., the hand of the user 110). While the pointing object 114 is pointing to the target person 120, the electronic device 112 may capture the image 210 including the persons 120, 130, 140, and 150 via the image sensor 220. In some embodiments, the electronic device 112 may be configured to capture the image 210 in response to detecting the pointing object 114 or receiving an input command from the user 110.

From the image 210, the electronic device 112 may detect the pointing object 114 in the image 210 by performing any suitable object detection methods as described above. The detected pointing object 114 in the image 210 is recognized as an indication of the target person 120. The electronic device 112 detects the face 212 of the target person 120 in the image 210 based on the indication.

In one embodiment, a direction in which the pointing object 114 is pointing is determined for detecting the face 212 of the target person 120. The electronic device 112 may determine that the pointing object 114 is directed to the target person 120 and detect the face 212 of the target person 120. In another embodiment, the electronic device 112 may detect the face 212 of the target person 120 based on a location of the pointing object 114 in the image 210. For example, a face nearest to the pointing object 114 in the image 210 is determined to be the face 212 of the target person 120.

Upon detecting the face 212 of the target person 120, the electronic device 112 may extract a set of facial features of the target person 120 from the detected face 212 in the image 210 using any suitable feature extraction methods as described above. The electronic device 112 may generate a connection request including the extracted set of facial features of the target person 120 and the identification information of the electronic device 112. The connection request is transmitted to the electronic devices 122, 132, 142, and 152, for example, by broadcasting or multicasting the connection request.

Figure 3:
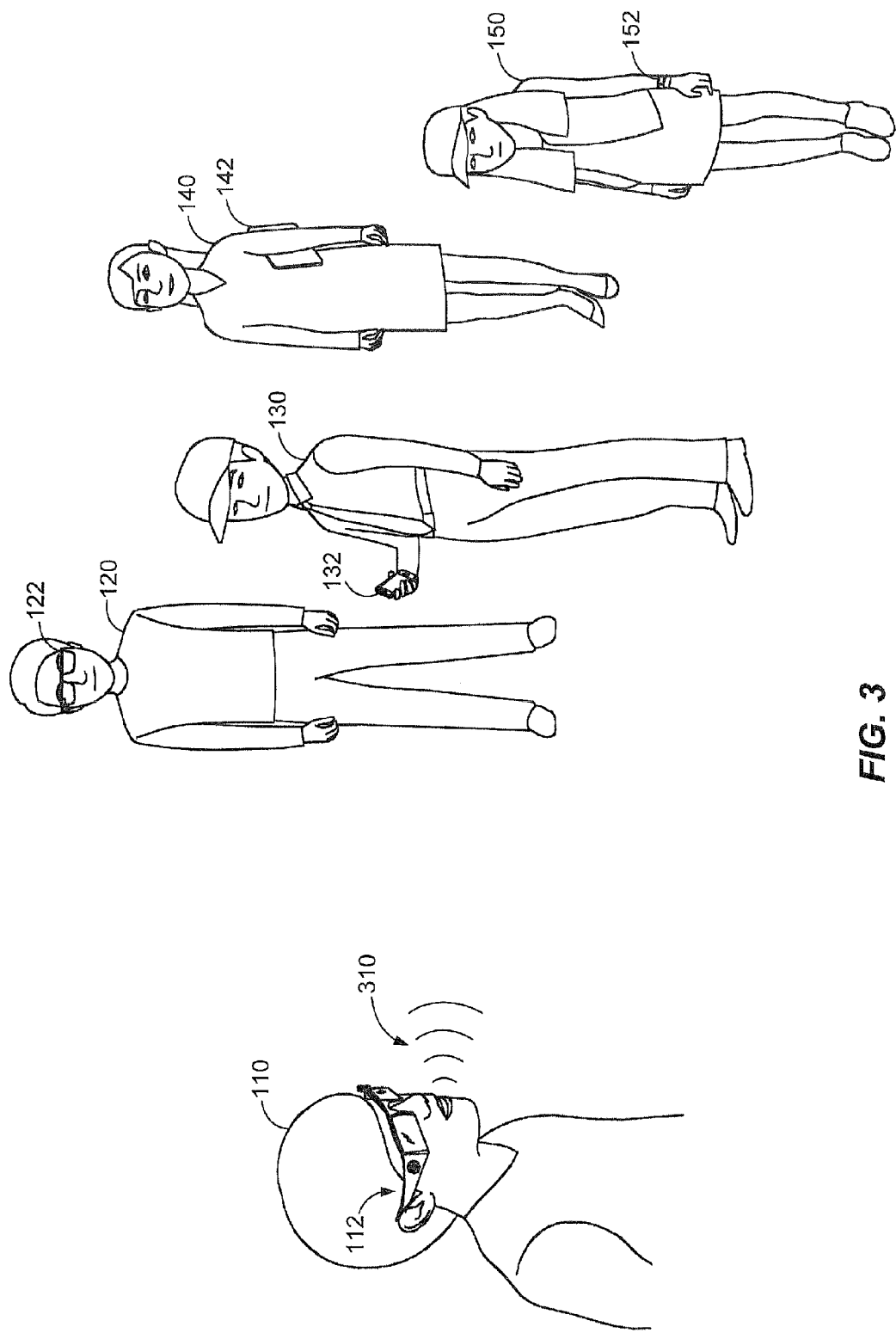
FIG. 3 illustrates an electronic device of a user that is configured to connect to a target device of a target person based on a speech command of the user, according to one embodiment of the present disclosure.

FIG. 3 illustrates the electronic device 112 of the user 110 that is configured to connect to any of the plurality of electronic devices 122, 132, 142, and 152 based on a speech command 310 of the user 110, according to one embodiment of the present disclosure. The electronic devices 112, 122, 132, 142, and 152 illustrated in FIG. 3 may be the same or similar units as those in FIG. 1. As used herein, the term "speech command" refers to any analog or digital representation of one or more words uttered from a speaker indicating, identifying, or describing an object such as a person. Further, the speech command may include one or more nouns, pronouns, adjectives or the like for indicating, identifying, or describing the object.

In one embodiment of the present disclosure, a speech command for identifying a target person may include one or more descriptions that describe an appearance of the target person, e.g., a gender description such as "BOY," "GIRL," "MAN," "WOMAN," "HIM," and "HER," an article description of clothing such as "CAP," "GLASSES," "SKIRT," "SHIRT," "TIE," a color description such as "IN BLUE," "WEARING RED CLOTHES," and the like. In another embodiment, a speech command may include a name of the target person (e.g., "JOHN," "ANN," "BOB," and the like) or a location of the target person within a field of view of a speaker (e.g., "LEFT," "RIGHT," "FRONT," "BACK," and the like).

In the illustrated embodiment of FIG. 3, the user 110 may select any of the persons 120, 130, 140, and 150 as a target person for establishing a connection between the electronic device 112 and the electronic devices 122, 132, 142, and 152 and speak a speech command to identify the target person. For example, the user 110 may speak "CONNECT TO THAT GIRL ON THE LEFT" as the speech command 310 to identify the person 140 as the target person. The electronic device 112 may receive an input sound including the speech command 310 from the user 110 identifying the target person 140. In addition, the electronic device 112 may capture an image of at least the target person 140 among the persons 120, 130, 140, and 150.

From the received input sound, the electronic device 112 may recognize the speech command 310 (i.e., "CONNECT TO THAT GIRL ON THE LEFT") as an indication of the target person 140 using any suitable speech recognition methods. A face of the target person 140 may be detected in the captured image based on the indication using suitable object detection methods as described above and a set of facial features of the target person 140 may be extracted from the detected face in the image using suitable feature extraction methods as described above. The electronic device 112 may then transmit a connection request to the electronic devices 122, 132, 142, and 152, for example, by broadcasting or multicasting the connection request. The connection request may include the extracted set of facial features of the target person 140 and the identification information of the electronic device 112.

Upon receiving the connection request, each of the electronic devices 122, 132, 142 and 152 may verify whether it is an intended recipient of the connection request (i.e., a target device in this embodiment) by comparing the received set of facial features with the stored set of facial features. In the illustrated embodiment, the electronic device 142 associated with the target person 140 may verify that the received set of facial features is indicative of the target person 140 by comparing the received set of facial features with the stored set of facial features, and respond to the connection request by transmitting a response message to the electronic device 112. The response message may include the identification information of the electronic device 142. When the electronic device 112 receives the response message accepting the connection request, a communication connection between the electronic devices 112 and 142 may be established.

Figure 4:
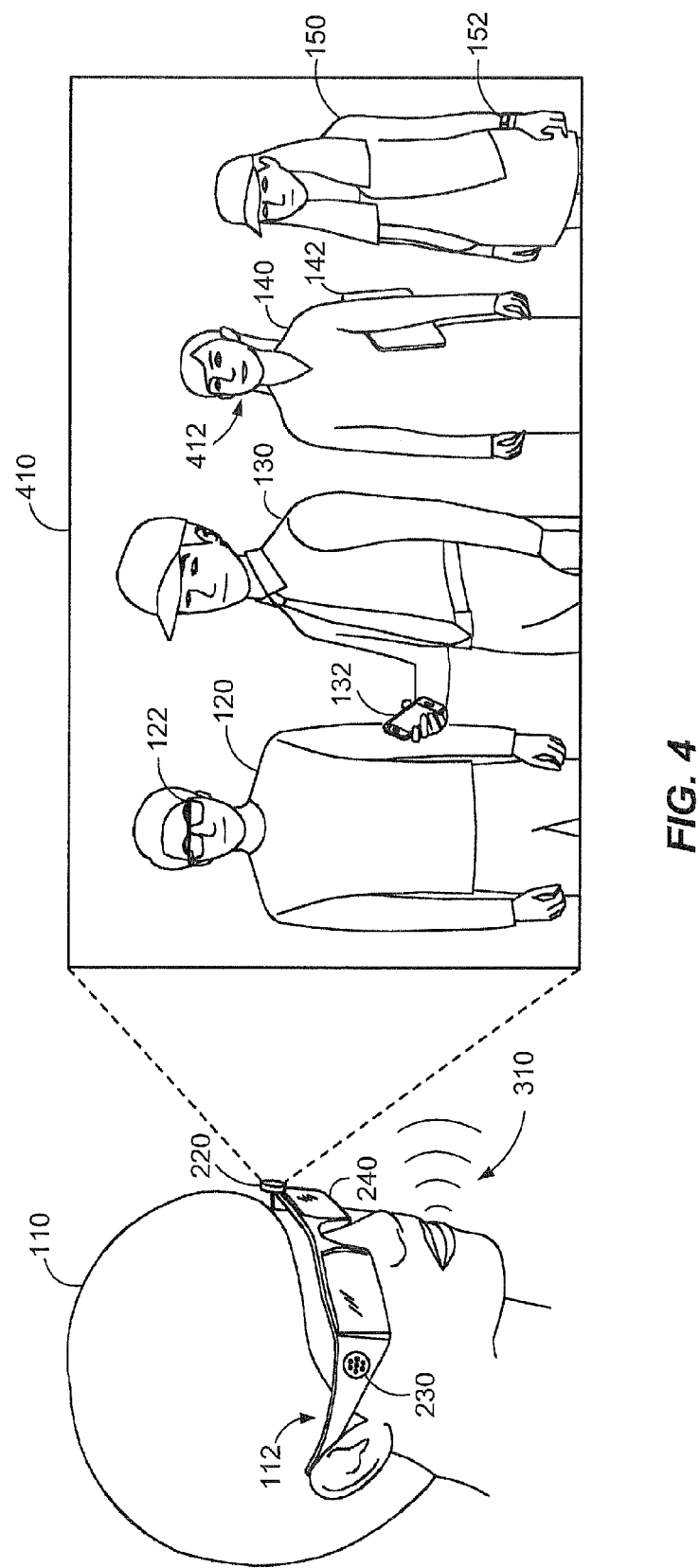
FIG. 4 illustrates an electronic device configured to detect a face of a target person in an image based on a speech command identifying the target person, according to one embodiment of the present disclosure.

FIG. 4 illustrates the electronic device 112 configured to detect a face 412 of the target person 140 in an image 410 based on the speech command 310 identifying the target person 140, according to one embodiment of the present disclosure. As described with reference to FIG. 2 above, the electronic device 112 is illustrated as smart glasses equipped with the image sensor 220, the sound sensor 230, and the optical lenses 240. In the illustrated embodiment, the user 110 of the electronic device 112 may look at the persons 120, 130, 140, and 150 and speak the speech command 310 (e.g., "CONNECT TO THAT GIRL ON THE LEFT") for identifying the target person 140.

Upon receiving an input sound including the speech command 310 from the user 110 via the sound sensor 230, the electronic device 112 may recognize the speech command 310 from the input sound as an indication of the target person 140 using any suitable speech recognition methods. For example, the electronic device 112 may extract one or more sound features (e.g., audio finger fingerprints, MFCC (mel-frequency cepstral coefficients) vectors, or the like). The extracted sound features are analyzed using suitable speech recognition methods based on the GMM (Gaussian mixture model), the HMM (hidden Markov model), the SMM (semi-Markov model), or the like to recognize the speech command 310. In addition, the electronic device 112 may be configured to capture the image 410 in response to recognizing the speech command 310 from the input sound or receiving an input command from the user 110.

Based on the recognized speech command 310, the electronic device 112 may detect the face 412 of the target person 140 in the image 410. In some embodiments, the electronic device 112 may detect candidate objects such as face objects or person objects of the persons 120, 130, 140, and 150 in the image 410. When such candidate objects are determined, the face 412 of the target person 140 may be detected from the candidate objects based on descriptions in the speech command 310, for example, which describe an appearance, a gender, a color, a name, a location, or the like of the target person 140.

In the illustrated embodiment, when the speech command 310 is recognized as "CONNECT TO THAT GIRL ON THE LEFT," the electronic device 112 may examine the candidate objects in the image 410 (e.g., the face objects or the person objects of the persons 120, 130, 140, and 150) with facial and location characteristics based on the descriptions of the target person 140 in the speech command 310 such as "GIRL" and "LEFT." In this case, since the description "GIRL" indicates female, the electronic device 112 may identify a gender for each of the candidate objects of the persons 120, 130, 140, and 150 using any suitable face recognition methods and determine that the image 410 includes two female persons, i.e., the persons 140 and 150. For example, the face recognition methods may include, but are not limited to, holistic detection, part-based detection, patch-based detection, decision trees, boosting, neural networks, support vector machines, and the like.

Once the two female persons 140 and 150 are determined, the electronic device 112 may identify one of the two female persons 140 and 150 as the target person based on the description "LEFT" in the speech command 310. In this case, since the description "LEFT" may indicate a relative location for the target person in the image 410, the electronic device 112 may identify the person 140, who is located at a left side relative to the person 150, as the target person. In such a manner as described above, when a captured image includes a plurality of persons, the electronic device 112 may identify a target person among the plurality of persons based on one or more descriptions in a speech command as an indication of the target person.

Upon identifying the target person 140, the electronic device 112 may detect the face 412 of the target person 140 in the image 410 and extract a set of facial features of the target person 140 from the detected face 412. The electronic device 112 may generate a connection request including the extracted set of facial features of the target person 140 and the identification information of the electronic device 112. The connection request is transmitted to the electronic devices 122, 132, 142, and 152, for example, by broadcasting or multicasting the connection request.

Figure 5:
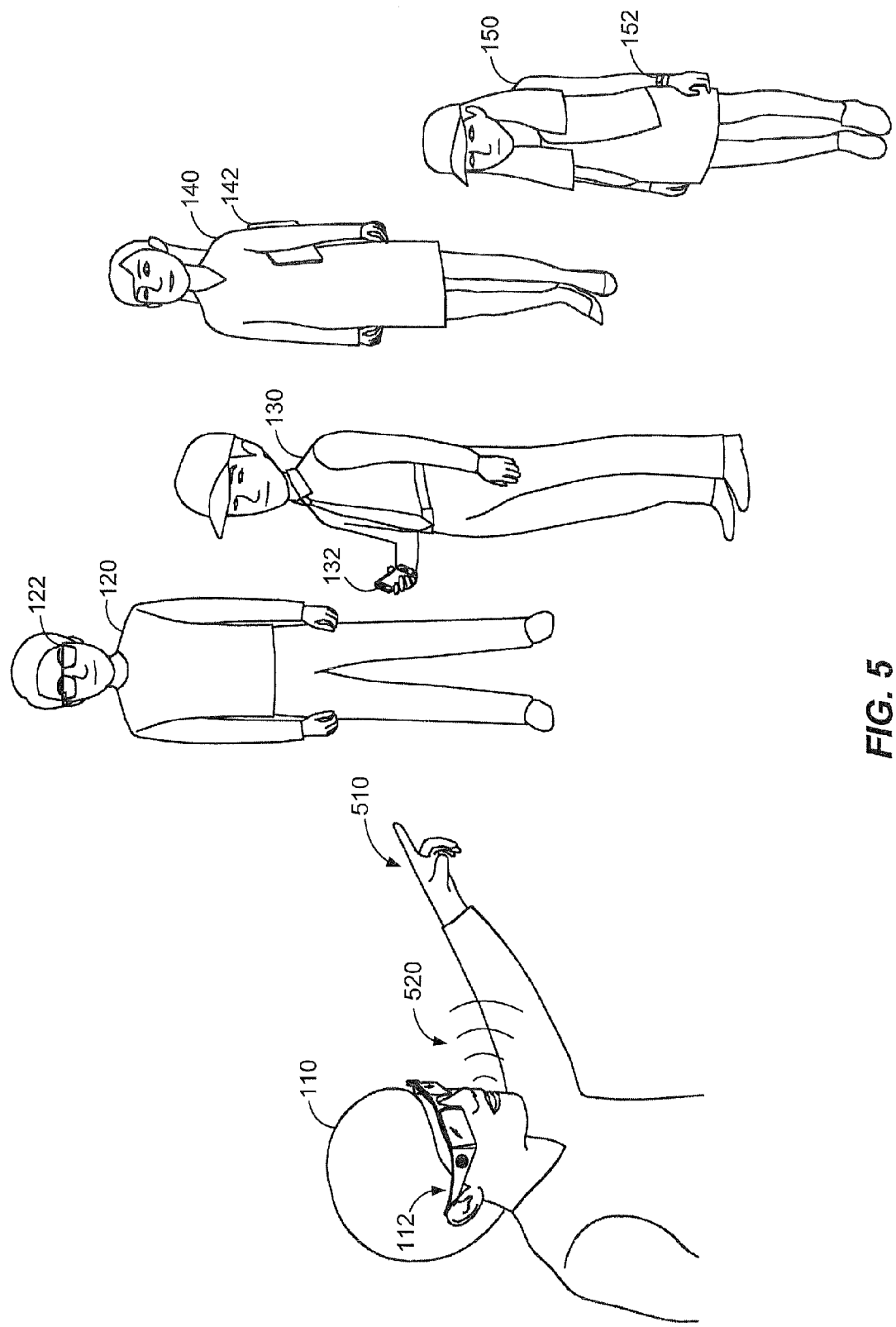
FIG. 5 illustrates an electronic device of a user that is configured to connect to a target device of a target person based on a pointing object and a speech command of the user, according to one embodiment of the present disclosure.

FIG. 5 illustrates the electronic device 112 of the user 110 that is configured to connect to any of the plurality of electronic devices 122, 132, 142, and 152 based on a pointing gesture and a speech command 520 of the user 110, according to one embodiment of the present disclosure. The electronic devices 112, 122, 132, 142, and 152 illustrated in FIG. 5 may be the same or similar units as those in FIG. 1. In the illustrated embodiment, the user 110 may select any of the persons 120, 130, 140, and 150 as a target person for establishing a connection between the electronic device 112 and the electronic devices 122, 132, 142, and 152. For example, the user 110 may make a pointing gesture using his or her hand as a pointing object 510 and speak the speech command 520 (e.g., "CONNECT TO THAT PERSON WITH A CAP") to indicate the person 130 as the target person.

The electronic device 112 may capture an image including the user's hand as the pointing object 510 and at least the target person 130 among the persons 120, 130, 140, and 150. In addition, the electronic device 112 may receive an input sound including the speech command 520 from the user 110 identifying the target person 130. In one embodiment, the image including the pointing object 510 may be captured and the input sound including the speech command 520 is received simultaneously. In another embodiment, the image including the pointing object 510 may be captured before the input sound including the speech command 520 is received, or vice versa. Alternatively, the image including the pointing object 510 may be captured while the input sound including the speech command 520 is received, or vice versa.

From the captured image, the electronic device 112 may recognize the pointing object 510 of the user's hand as being a first indication of the target person 130. In addition, from the received input sound, the electronic device 112 may recognize the speech command 520 (i.e., "CONNECT TO THAT PERSON WITH A CAP") as a second indication of the target person 130. A face of the target person 130 may be detected in the captured image based on the first and the second indications using any suitable object detection methods.

In some embodiments, when a face of a target person cannot be detected in a captured image based on one or more indications that are initially recognized, the electronic device 112 may request the user 110 to provide an additional indication for identifying the target person such as a pointing object, a speech command, and any other suitable input commands. For example, the electronic device 112 may detect a plurality of faces or persons in a captured image based on one or more initial indications. In this case, the electronic device 112 may output a request for an additional indication identifying a target person. In response, the user 110 may identify the target person, for example, by making a pointing gesture with a pointing object or speaking a speech command. The electronic device 112 may recognize an additional indication of the target person, for example, by capturing an image including the pointing object or receiving an input sound including the speech command. The target person may be identified among the plurality of faces or persons based on the additional indication and a face of the target person may be detected from the identified target person in the image.

In the embodiment of FIG. 5, once the face of the target person 130 is detected in the captured image, the electronic device 112 may extract a set of facial features of the detected face of the target person 130 from the captured image using any suitable feature extraction methods. The electronic device 112 may then transmit a connection request to the electronic devices 122, 132, 142, and 152, for example, by broadcasting or multicasting the connection request. The connection request may include the extracted set of facial features of the target person 130 and the identification information of the electronic device 112.

When the electronic devices 122, 132, 142, and 152 receive the connection request from the electronic device 112, the electronic device 132 associated with the target person 130 may verify that it is an intended recipient of the connection request (i.e., a target device in this embodiment) by comparing the received set of facial features with the stored set of facial features. Once verified, the target device 132 may respond to the connection request by transmitting a response message to the electronic device 112. When the electronic device 112 receives the response message from the target device 132, a communication connection between the electronic devices 112 and 132 may be established.

Figure 6:
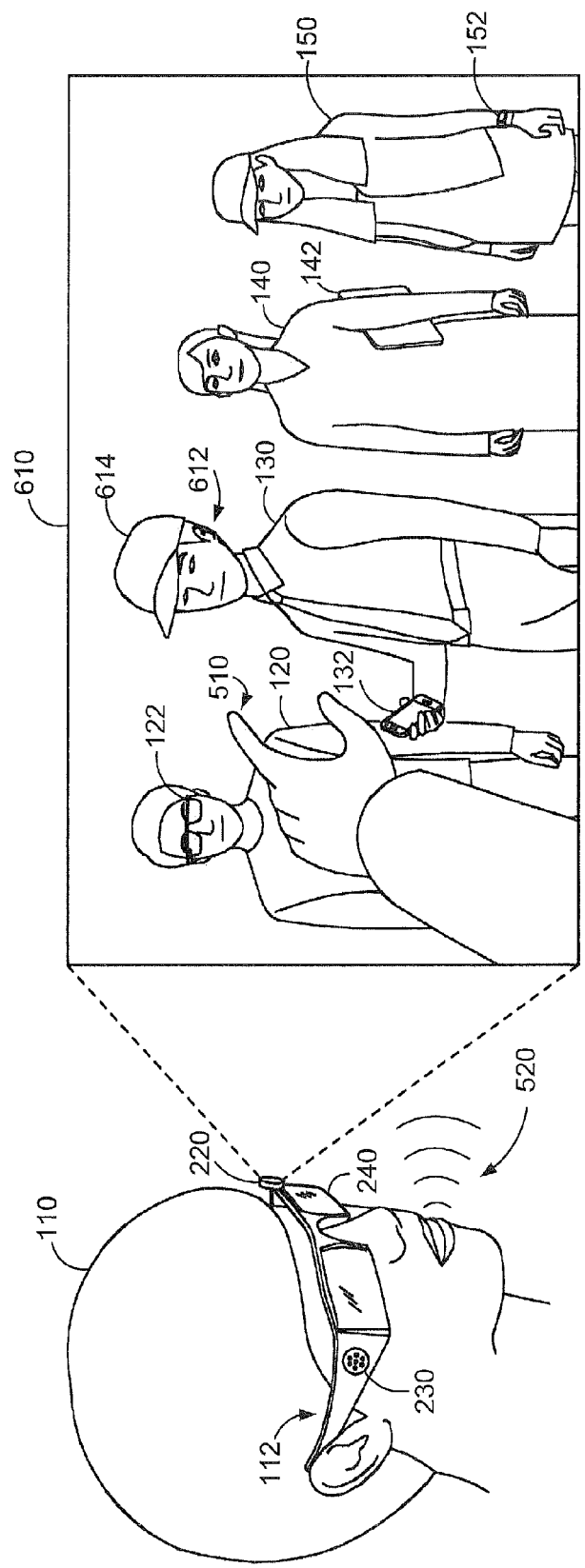
FIG. 6 illustrates an electronic device configured to detect a face of a target person in an image based on a pointing object and a speech command indicating the target person, according to one embodiment of the present disclosure.

FIG. 6 illustrates the electronic device 112 configured to detect a face 612 of the target person 130 in an image 610 based on the pointing object 510 and the speech command 520 indicating the target person 130, according to one embodiment of the present disclosure. As described with reference to FIG. 2 above, the electronic device 112 is illustrated as smart glasses equipped with the image sensor 220, the sound sensor 230, and the optical lenses 240. In the illustrated embodiment, while looking at the persons 120, 130, 140, and 150, the user 110 of the electronic device 112 may make a pointing gesture by using the his or her hand as the pointing object 510 and speak the speech command 520 (e.g., "CONNECT TO THAT PERSON WITH A CAP") for indicating the target person 130.

The electronic device 112 may capture the image 610 including the pointing object 510 and the persons 120, 130, 140, and 150 via the image sensor 220. From the image 610, the pointing object 510 is detected and recognized as a first indication of the target person 130 by the electronic device 112. However, as illustrated in FIG. 6, the pointing object 510 points to a halfway location between the persons 120 and 130 in the image 610, and the electronic device 112 may not identify the person 130 as a target person based on the first indication (i.e., the pointing object 510) alone. In this case, the persons 120 and 130 may be detected as candidate objects based on the first indication.

In this embodiment, the electronic device 112 may also receive an input sound including the speech command 520 from the user 110 via the sound sensor 230 and recognize the speech command 520 from the input sound as a second indication of the target person 130. Based on the second indication (i.e., the speech command 520), the electronic device 112 may detect the face 612 of the target person 130 in the image 610. For example, the electronic device 112 may examine the candidate objects in the image 610 (i.e., the persons 120 and 130) with clothing characteristics based on the descriptions of the target person 130 in the speech command 520 such as "CAP." In this case, the electronic device 112 may detect a cap 614 of the person 130 based on the description "CAP" and then identify the person 130 as the target person among the candidate objects. From the target person 130, the face 612 may be detected.

Once the face 612 of the target person 130 is detected based on the first and the second indications, the electronic device 112 may extract a set of facial features of the target person from the detected face 612. The electronic device 112 may generate a connection request including the extracted set of facial features of the target person 130 and the identification information of the electronic device 112. The connection request is transmitted to the electronic devices 122, 132, 142, and 152, for example, by broadcasting or multicasting the connection request.

Figure 7:
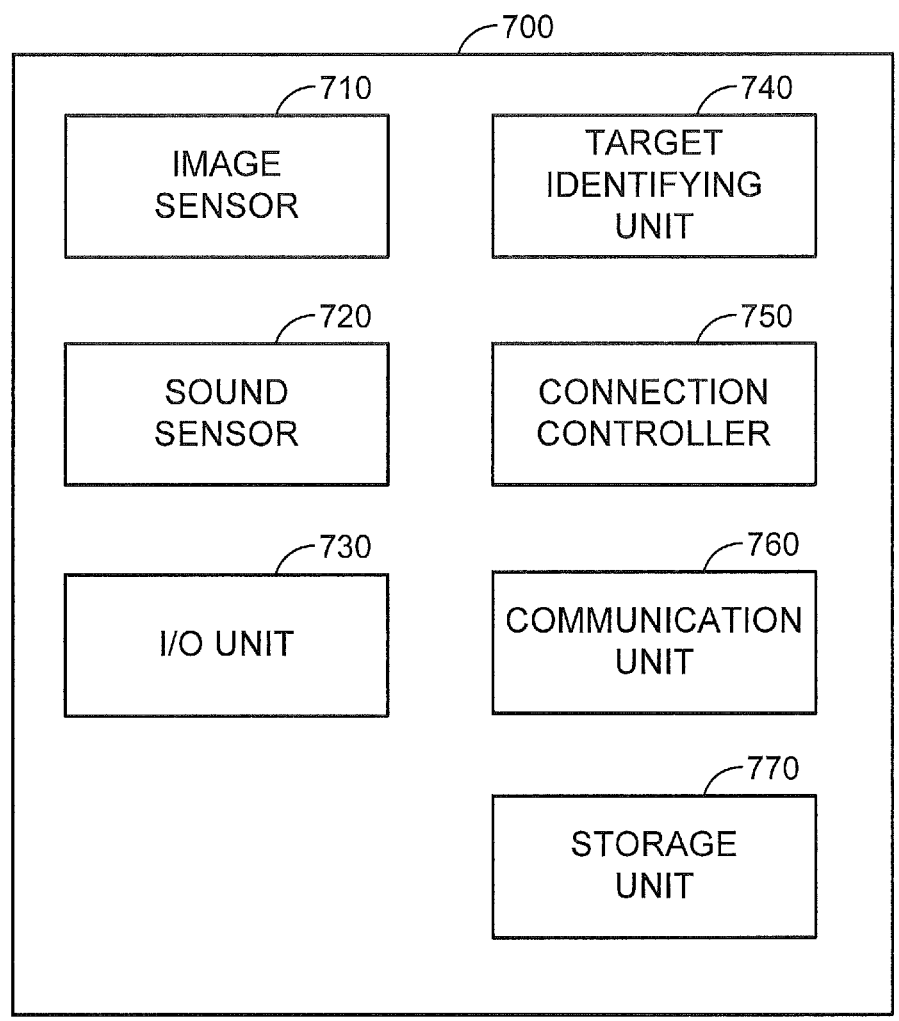
FIG. 7 illustrates a block diagram of an electronic device configured to connect to another electronic device by transmitting a connection request, according to one embodiment of the present disclosure.

FIG. 7 illustrates a block diagram of an electronic device 700 configured to connect to another electronic device associated with a target person (i.e., a target device) by transmitting a connection request, according to one embodiment of the present disclosure. The electronic device 700 may include an image sensor 710, a sound sensor 720, an I/O (input/output) unit 730, a target identifying unit 740, a connection controller 750, a communication unit 760, and a storage unit 770. The electronic device 700 may be any suitable device equipped with a sound capturing and processing capability such as a cellular phone, a smartphone, a smart watch, smart glasses, a personal computer, a laptop computer, a tablet computer, a smart television, a gaming device, a multimedia player, etc. Further, the electronic device 112 as described above with reference to FIGS. 1 to 6 may also be configured with the components of the electronic device 700 as illustrated in FIG. 7.

The image sensor 710 may be configured to capture an image in the field of view of the image sensor 710 in response to detecting a pointing object, recognizing a speech command, or receiving an input command from a user of the electronic device 700 via the I/O unit 730. In another embodiment, the image sensor 710 may continuously or periodically capture one or more images or videos in its field of view. The image may include a pointing object and/or faces of persons. The image captured by the image sensor 710 may be permanently (e.g., in the form of an electronic file) or temporarily stored in the storage unit 770 of the electronic device 700. The image sensor 710 may include any suitable number of cameras, image sensors, or video cameras for sensing one or more images. The image captured by the image sensor 710 may be provided to the target identifying unit 740, which may be configured to determine whether the image includes a pointing object and/or a face of a person.

The sound sensor 720 may be configured to receive (e.g., capture) an input sound including a speech command from the user that identifies a target person in the image captured by the image sensor 710. In one embodiment, the image may be captured in response to receiving (or recognizing) a speech command identifying a target person. In another embodiment, the image may be captured before or at the time of receiving (or recognizing) such a speech command.

The sound sensor 720 may convert the input sound including the speech command into input sound data, which may be provided to the target identifying unit 740 for detecting a face of a target person in the captured image. The sound sensor 720 may include one or more microphones or any other types of sound sensors that can be used to receive, capture, sense, and/or detect the input sound. In addition, the sound sensor 720 may employ any suitable software and/or hardware for performing such functions.

The I/O unit 730 may be configured to receive an input command from the user and/or output information for the user. The I/O unit 730 may be any suitable device capable of receiving an input command and/or outputting information such as a touchscreen, a touchpad, a touch sensor, a button, a key, and the like. In the case of a touch screen as the I/O unit 730, the touch screen may display an image of persons (e.g., the persons 120, 130, 140, and 150 as illustrated in FIG. 1) that is captured by the image sensor 710, and the user of the electronic device 700 may touch the touch screen at a location in the displayed image where a target person is displayed. The touch input may be received as an input command indicating the target person. The input command may be provided to the target identifying unit 740 for detecting a face of the target person in the captured image.

In one embodiment, the electronic device 700 may operate in an image capturing mode, in which the image sensor 710 may be continuously capturing images including a target person and the I/O unit 730 may be continuously displaying the images. In this case, the I/O unit 730 may display a marker such as a box, a cross, a dot, a circle, or the like over the displayed images. When the marker is displayed over a face of a target person, the user of the electronic device 700 may input a command via the I/O unit 730 to select the target person in the image.

The storage unit 770 may store an object database for detecting objects such as face objects, pointing objects, identifying objects (e.g., caps, glasses, skirts, shirts, ties, and the like) in an image. The object database may include one or more reference features and/or reference shapes of the objects. For example, the object database may store one or more features and/or shapes indicative of face objects such as a person's eyes, eyebrows, nose, lips, ears, etc., pointing objects such as a person's finger, hand, arm, body, etc., and identifying objects such as a person's cap, glasses, skirt, shirt, tie, etc.

The storage unit 770 may also store a plurality of speech commands or keywords such as "CONNECT," "PERSON," "HIM," "HER," "MAN," "WOMAN," "RIGHT," "LEFT," and the like for use in recognizing speech commands indicating a target person from input sound data. In addition, one or more speech models for recognizing speech commands or keywords such as a GMM, an HMM, an SMM, or the like may be stored in the storage unit 770. In some embodiments, a set of sound features may be extracted from the input sound data and analyzed based on the stored speech models to recognize a speech command in the input sound data.

The storage unit 770 may also include a reference facial feature database for recognizing persons' faces. The reference facial feature database may include one or more reference facial features and identification information (e.g., names, telephone numbers, addresses, email addresses, etc.) for one or more persons (e.g., friends, family members, the user, etc.). The reference facial features may be extracted from images including the persons' faces. The target identifying unit 740 may access the storage unit 770 for recognizing an indication of a target person and detecting a face of the target person in a captured image based on the indication. The storage unit 770 may be implemented using any suitable type of a memory device including, but not limited to, a RAM (Random Access Memory), a ROM (Read Only Memory), an EEPROM (Electrically Erasable Programmable Read Only Memory), or a flash memory to store various types of information and data.

The target identifying unit 740 may be configured to receive the image captured by the image sensor 710 that includes a target person. Additionally, the target identifying unit 740 may receive the input sound data including the speech command identifying the target person in the image from the sound sensor 720. In some embodiments, the input command from the I/O unit 730 indicating the target person in the image may be received by the target identifying unit 740.

The target identifying unit 740 may be configured to recognize an indication of the target person in the image. For example, the target identifying unit 740 may detect a pointing object in the image as the indication of the target person. Additionally or alternatively, the speech command may be recognized from the input sound data as the indication of the target person. In some embodiments, the input command from the I/O unit 730 may be recognized as the indication of the target person.

Based on the indication of the target person, the target identifying unit 740 may detect a face of the target person in the captured image. Once the face of the target person is detected, a set of facial features of the target person may be extracted from the detected face in the image using any suitable feature extraction methods as described above. The extracted set of facial features may be provided to the connection controller 750 for use in establishing a connection with an electronic device associated with the target person (i.e., a target device) via the communication unit 760.

In some embodiments, the target identifying unit 740 may detect more than one face in the captured image based on an indication of a target person such as a pointing object or a speech command. In this case, the target identifying unit 740 may request an additional indication for identifying the target person in the image. Based on the additional indication of the target person, the target identifying unit 740 may detect the face of the target person. For example, when the target identifying unit 740 cannot initially detect the face of the target person based on a pointing object detected in the image (for example, when more than one face is detected in the image), the target identifying unit 740 may request the user of the electronic device 700 to provide a speech command (e.g., a name, a gender, a location, or the like that identifies the target person in the image) as an additional indication of the target person. Based on the speech command identifying the target person, the target identifying unit 740 may determine one of the detected faces as the face of the target person.

The connection controller 750 may be configured to receive the extracted set of facial features of the target person from the target identifying unit 740 and generate a connection request for transmission to other electronic devices located in close proximity to the electronic device 700 including the target device of the target person. The connection request may be a request to establish a connection with the target device. The connection request may include the extracted set of facial features of the target person and identification information of the electronic device 700 such as a product identification number, a MAC address, an IP address, and the like. The connection controller 750 may provide the connection request to the communication unit 760, which may transmit the connection request to the other electronic devices. In some embodiments, the target identifying unit 740 and the connection controller 750 may be implemented using any suitable processing unit such as a central processing unit (CPU), an application processor (AP), a microprocessor unit (MPU), or the like that can execute instructions or perform operations for the electronic device 700. The target identifying unit 740 and the connection controller 750 may also be a hardware subsystem implemented in the electronic device 700.

The communication unit 760 may transmit the connection request by broadcasting or multicasting the connection request. In response to the connection request, the target device may verify the connection request, and if verified, transmit a response message accepting the connection request to the electronic device 700. The connection controller 750 may receive the response message from the target device via the communication unit 760, and establish a connection with the target device via the communication unit 760.

The communication unit 760 may implement any suitable short-range communication protocols including Bluetooth, Wi-Fi Direct, and the like having a relatively short communication range. In another embodiment, the communication unit 760 may communicate with other electronic devices using inaudible beacon sound signals such as ultrasound signals that have a relatively short communication range. By using such sound signals, the electronic device 700 can control communications with other electronic devices located within a short distance of the electronic device 700. Accordingly, the short communication range may prevent electronic devices located outside the communication range from receiving communication signals of the electronic device 700. In some embodiments, the communication range of the electronic device 700 may be adjusted by controlling an output power level of the communication signals.

In some embodiments, the connection controller 750 may generate the connection request that includes security information to allow the target device to verify whether the electronic device 700 is in close proximity to the target device. For example, the sound sensor 720 may capture an environmental sound such as voice of a user of the electronic device 700 or other persons, crowd noise, background music, and the like. To allow the target device to determine that the electronic device 700 is in close proximity, the connection controller 750 may transmit the connection request including a set of sound features extracted from the environmental sound via the communication unit 760.

In response to receiving the connection request, the target device may capture an environmental sound that is close in time to the received set of sound features in the connection request and extract a set of sound features from the captured environmental sound. By comparing the received and extracted sets of sound features, the target device may determine that the sound features are similar and verify whether the electronic device 700 is located in close proximity to the target device. For example, if the similarity between the received and extracted received sets of sound features exceeds a predetermined threshold, the target device may transmit a response message accepting the connection request to the electronic device 700 for establishing a connection.

According to one embodiment, the response message from the target device may include security information such as a set of sound features that is extracted from an environmental sound of the target device. Upon receiving such a response message, the electronic device 700 device may capture an environmental sound through the sound sensor 720 and extract a set of sound features from the captured environmental sound. The connection controller 750 may verify that the target device is located in close proximity to the electronic device 700 by comparing the received and extracted sets of sound features. If verified, the connection controller 750 may establish a connection with the target device.

According to another embodiment, the connection controller 750 may be configured to teiuiinate communication to the target device for establishing a connection when a plurality of response messages is received from a plurality of electronic devices in response to transmitting (e.g., broadcasting or multicasting) the connection request. In this case, the connection controller 750 may determine that the plurality of response messages indicates an attempt by one or more non-target electronic devices to establish a connection with the electronic device 700. For example, a plurality of response messages may be received within a predetermined period of time (e.g., one second) after transmitting a connection request or receiving a first response message among the plurality of response massages. In such a case, the connection controller 750 may determine that the target device cannot be verified and terminate communication without establishing a connection with the target device. In another embodiment, after terminating the communication, the connection controller 750 may re-transmit the connection request to establish a connection with the target device after a specified period of time or in response to a user input.

Figure 8:
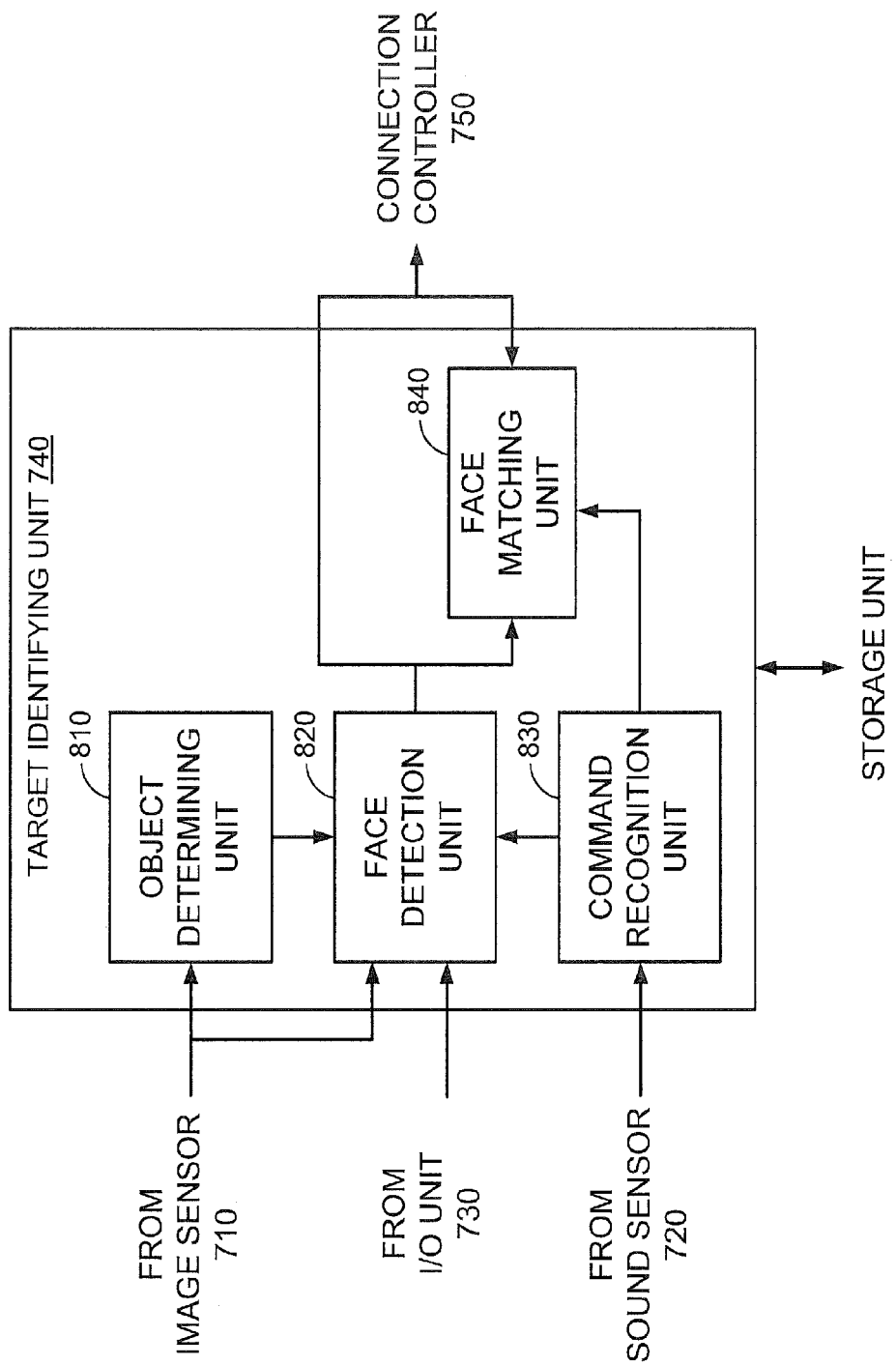
FIG. 8 illustrates a more detailed block diagram of a target identifying unit in the electronic device configured to detect a face of a target person in an image based on an indication of the target person, according to one embodiment of the present disclosure.

FIG. 8 illustrates a more detailed block diagram of the target identifying unit 740 configured to detect a face of a target person in an image based on an indication of the target person, according to one embodiment of the present disclosure. As shown, the target identifying unit 740 may include an object determining unit 810, a face detection unit 820, a command recognition unit 830, and a face matching unit 840. The indication of the target person may be a pointing object in a captured image from the image sensor 710, a speech command in sound data from the sound sensor 720, and/or an input command from the I/O unit 730.

In the target identifying unit 740, the object determining unit 810 may receive the captured image from the image sensor 710 and perform an object analysis (e.g., detection, segmentation, recognition, and the like) on the image to determine whether the image includes a pointing object as an indication of the target person. The pointing object may be any object that can be used to indicate the target person and include a person's finger, hand, arm, or body, or an object associated with the person's finger, hand, arm, or body. In some embodiments, the object determining unit 810 may perform an object analysis using a feature-based method, edge matching, grayscale matching, gradient matching, and the like.

In one embodiment, the object determining unit 810 may access a plurality of reference features of pointing objects stored in the object database in the storage unit 770 for use in detecting the pointing object in the image. The object determining unit 810 may extract features of objects in the image and determine whether one or more extracted features of the objects are similar to one or more reference features of the pointing objects in the object database. If a similarity between the extracted features of an object in the image and the reference features of a pointing object is determined to exceed a predetermined threshold, the object for the extracted features is determined as the pointing object and recognized as an indication of the target person. The pointing object as the indication of the target person may be provided to the face detection unit 820 for detecting the face of the target person.

The command recognition unit 830 may be configured to receive the input sound data from the sound sensor 720 and recognize a speech command in the input sound data as an indication of the target person in the image. For example, one or more sound features (e.g., audio finger fingerprints, MFCC vectors, and the like) may be extracted from the input sound data. The command recognition unit 830 may recognize the speech command from the extracted sound features using any suitable speech recognition methods based on the GMM, the HMM, the SMM, or the like.

The speech command may include any description that may identify the target person such as a name of the target person. In one embodiment, the speech command may describe an appearance of the target person in the image (e.g., gender, clothing article, color descriptions, and the like). In another embodiment, the speech command may indicate a location of the target person in the image (e.g., left, right, front, back, and the like). The recognized speech command may be provided to the face detection unit 820 as the indication of the target person for detecting the face of the target person in the image from the image sensor 710.

The face detection unit 820 may be configured to receive the image from the image sensor 710, and one or more indications of the target person from at least one of the object determining unit 810 and the command recognition unit 830. In addition, the I/O unit 730 may receive an input command indicating the target person in the image and provide the input command to the face detection unit 820 as an indication of the target person. From the image, the face detection unit 820 may detect the face of the target person based on at least one indication such as the pointing object, the speech command, and the input command. Once the face of the target person is detected, a set of facial features of the target person may be extracted from the detected face for generating a connection request.

In one embodiment, the face of the target person may be detected based on the pointing object. In this case, the face detection unit 820 may determine that the pointing object indicates the target person in the image and detect the face of the target person. For example, the face detection unit 820 may detect a face nearest to the pointing object in the image as the face of the target person. Alternatively, a person nearest to the pointing object may be detected as the target person and a face of the nearest person may be detected as the face of the target person. In another embodiment, the target person may be detected by determining a person in the image to which the pointing object is pointing.

According to another embodiment, the face of the target person may be detected based on the speech command from the command recognition unit 830. Based on the speech command, the face detection unit 820 may detect at least one face in the image and recognize the target person. For example, the face detection unit 820 may detect the face of the target person based on one or more descriptions in the speech command that describe an appearance and/or a location of the target person.

The face of the target person may be detected based on both the pointing object and the speech command when the face of the target person in the image is not detected based on either the pointing object or the speech command alone. In this case, the target identifying unit 740 may output a message requesting a user of the electronic device 700 to provide an additional indication of the target person such as an additional pointing object or speech command. Based on the additional indication from the user, the face detection unit 820 may detect the face of the target person in the image and extract a set of facial features of the target person.

In some embodiments, the face of the target person in the image may be determined based on the input command from the I/O unit 730. For example, when the I/O unit 730 is a touch screen that displays the image, the I/O unit 730 may receive an input command, for example, a touch input on a location in the image where the target person is displayed. The face detection unit 820 may receive the input command from the I/O unit 730 that includes the touched location in the image (e.g., coordinates of the touch input in the image) as the indication of the target person. Based on the indication, the face detection unit 820 may determine a person closest to the touched location as the target person and detect the face of the target person in the image. A set of facial features of the target person may be extracted from the detected face of the target person.

The face of the target person in the image may also be detected based on a name of the target person (e.g., "JOHN") that is included in a speech command (e.g., "CONNECT TO JOHN"). In this case, the sound sensor 720 may capture an input sound from the user that includes the name of the target person and output sound data including the name of the target person as a speech command to the command recognition unit 830. The command recognition unit 830 may recognize the speech command as identifying the name of the target person and outputs the speech command to the face detection unit 820. Upon receiving the speech command identifying the name of the target person, the face detection unit 820 may detect one or more faces in the image from the image sensor 710 and extract one or more sets of facial feature for the detected faces. The extracted sets of facial features are provided to the face matching unit 840.

The face matching unit 840 may be configured to receive the name in the speech command from the command recognition unit 830 (or the face detection unit 820) and the extracted sets of facial features from the face detection unit 820. The face matching unit 840 may access the storage unit 770 to retrieve a set of reference facial features associated with the name of the target person. From the extracted sets of facial features of the persons in the image, a set of facial features that matches the reference facial features for the name of the target person is selected as a set of facial features for the target person.

The connection controller 750 is configured to receive the set of facial features of the target person from the face detection unit 820 or the face matching unit 840 and generate a connection request including the set of facial features and the identification information of the electronic device 700. The connection request may be transmitted (e.g., broadcast or multicast) to the target device of the target person via the communication unit 760. In response to the connection request, the target device may transmit a response message accepting the connection request. Upon receiving the response message via the communication unit 760, the electronic device 700 may establish a connection with the target device.

In some embodiments, the response message from the target device may include security information to allow the electronic device 700 to verify that the target device is in close proximity to the electronic device 700. For example, the security information may include a set of facial features of the user of the electronic device 700. In this case, the target device may capture an image including the user and extract the set of facial features of the user. The target device may transmit the response message including the extracted set of facial features of the user to the electronic device 700.

When the electronic device 700 receives the response message, the connection controller 750 in the electronic device 700 may provide the received set of facial features in the response message to the face matching unit 840. The face matching unit 840 may retrieve a set of reference facial features of the user of the electronic device 700 by accessing the storage unit 770. If the received set of facial features is indicative of the retrieved set of reference facial features, the face matching unit 840 verifies that the target device is in close proximity to the electronic device 700 and instructs the connection controller 750 to establish a connection with the target device.

Figure 9:
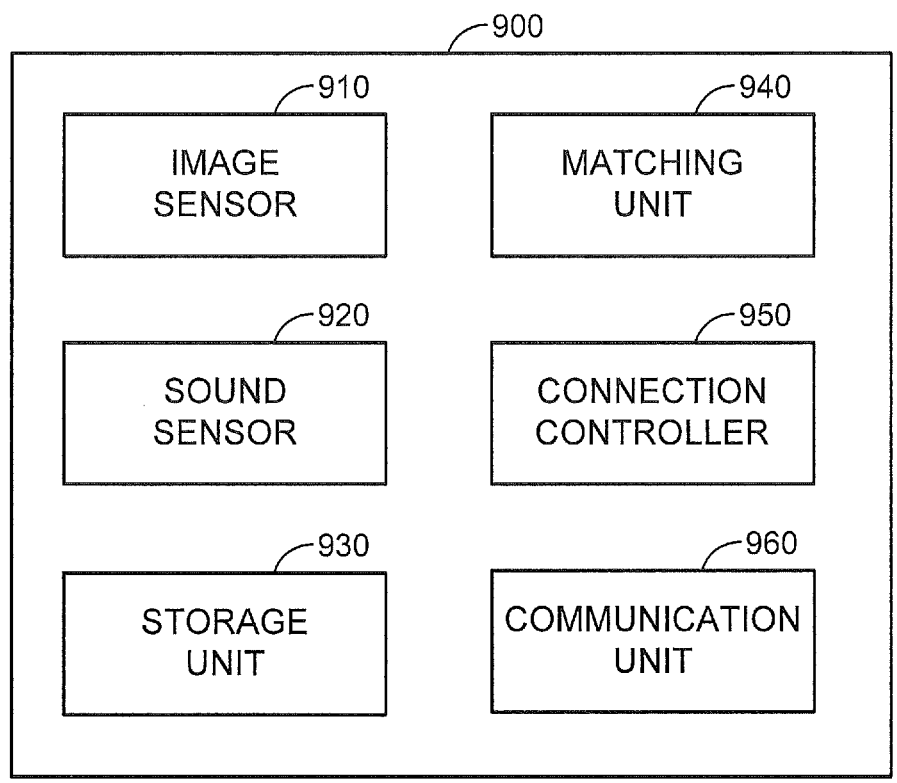
FIG. 9 illustrates a block diagram of an electronic device configured to connect with another electronic device by transmitting a response message, according to one embodiment of the present disclosure.

FIG. 9 illustrates a block diagram of an electronic device 900 configured to connect with another electronic device by transmitting a response message, according to one embodiment of the present disclosure. The electronic device 900 may include an image sensor 910, a sound sensor 920, a storage unit 930, a matching unit 940, a connection controller 950, and a communication unit 960. The image sensor 910, the sound sensor 920, the storage unit 930, and the communication unit 960 are the same or similar components as those in FIG. 7. Further, the electronic devices 122, 132, 142, and 152 in FIGS. 1 to 6, which may be selected as a target device associated with a target person, may be configured with the components of the electronic device 900 illustrated in FIG. 9.

The image sensor 910 may be configured to capture an image in the field of view of the image sensor 910 in response to receiving the connection request from another electronic device or receiving an input command from a user of the electronic device 900. In another embodiment, the image sensor 910 may continuously or periodically capture one or more images or videos in its field of view. The captured image may be permanently (e.g., in the form of an electronic file) or temporarily stored in the storage unit 930. The image sensor 910 may include any suitable number of cameras, image sensors, or video cameras for sensing one or more images.

The sound sensor 920 may be configured to capture an environmental sound as an input sound and convert the captured environmental sound into input sound data. The environmental sound may include voice of the user or other persons, crowd noise, background music, and the like. The input sound data may be provided to the matching unit 940 for verifying whether the other electronic device that transmits the connection request is located in close proximity to the electronic device 900, which will be described below in detail. The sound sensor 920 may include one or more microphones or any other types of sound sensors that can be used to receive, capture, sense, and/or detect the input sound. In addition, the sound sensor 920 may employ any suitable software and/or hardware for performing such functions.

The storage unit 930 may include a reference facial feature database for the user of the electronic device 900. The reference facial feature database may include a set of reference facial features of the user which may be extracted from an image including the user's face. The storage unit 930 may be implemented using any suitable type of a memory device including, but not limited to, a RAM (Random Access Memory), a ROM (Read Only Memory), an EEPROM (Electrically Erasable Programmable Read Only Memory), or a flash memory to store various types of information and data.

The matching unit 940 may be configured to verify whether the electronic device 900 is an intended recipient of the received connection request (i.e., a target device). The connection request from another electronic device (e.g., the electronic device 700 in FIG. 7) may be received by the communication unit 960. The connection request may include a set of facial features of a target person which is extracted from an image captured by the other electronic device. The connection request may also include identification information of the other electronic device such as a product identification number, a MAC address, an IP address, and the like. The received set of facial features may be provided to the matching unit 940.

In response to receiving the set of facial features of the target person, the matching unit 940 may retrieve the set of reference facial features for the user of the electronic device 900 by accessing the storage unit 930. If the received set of facial features of the target user is indicative of the retrieved set of reference facial features of the user, the matching unit 940 verifies that the user of the electronic device 900 is the target person and the electronic device 900 is the intended recipient, i.e., the target device. In this case, the matching unit 940 may instruct the connection controller 950 to accept the connection request.

In one embodiment, the matching unit 940 may be configured to verify whether the other electronic device that transmits the connection request is in close proximity to the electronic device 900 based on environmental sounds. In this case, the connection request may include security information such as a set of sound features that is extracted from an environmental sound captured by the other electronic device. Upon receiving the set of sound features, an environmental sound may be captured by the sound sensor 920 and a set of sound features is extracted from the environmental sound. The set of sound features may be extracted in the connection controller 950 or a separate feature extraction unit (not shown). The extracted set of sound features is provided to the matching unit 940.

By comparing the received and extracted sets of sound features, the matching unit 940 may determine that the sound features are similar and verify that the electronic device 900 and the other electronic device are in close proximity. For example, if the similarity between the received and extracted sets of sound features exceeds a predetermined threshold, the other electronic device is verified to be in close proximity to the electronic device 900. In this case, the matching unit 940 may also instruct the connection controller 950 to accept the connection request.

In response to the instructions from the matching unit 940, the connection controller 950 may generate a response message for transmission to the other electronic device. The response message may be an acceptance message to establish a connection between the electronic device 900 and the other electronic device and include identification information of the electronic device 900 such as a product identification number, a MAC address, an IP address, and the like. The response message may be transmitted to via the communication unit 960 using the received identification information of the other electronic device as a destination address. When the other electronic device receives the response message, it may establish a connection with the electronic device 900 as a target device. In some embodiments, the matching unit 940 and the connection controller 950 may be implemented using any suitable processing unit such as a central processing unit (CPU), an application processor (AP), a microprocessor unit (MPU), or the like that can execute instructions or perform operations for the electronic device 900. The matching unit 940 and the connection controller 950 may also be a hardware subsystem implemented in the electronic device 900.

Similar to the electronic device 700 in FIG. 7, the communication unit 960 may implement any suitable short-range communication protocols including Bluetooth, Wi-Fi Direct, and the like having a relatively short communication range. Further, inaudible beacon sound signals such as ultrasound signals that have a relatively short communication range may be used. In some embodiments, the communication range of the electronic device 900 may be adjusted based on an output power of the communication signals.

According to one embodiment, the connection controller 950 may generate a response message that includes security information to allow the other electronic device to verify whether the electronic device 900 as a target device is in close proximity to the other electronic device. For example, the sound sensor 920 may capture an environmental sound and the connection controller 950 may generate the response message including a set of sound features that is extracted from the environmental sound. The response message may be transmitted to the other electronic device via the communication unit 960 to allow the electronic device to verify whether the electronic device 900 is in close proximity to the other electronic device.

In response to receiving the response message from the electronic device 900, the other electronic device may capture an environmental sound and extract a set of sound features from the captured environmental sound. By comparing the received and extracted sets of sound features, the other electronic device may verify whether the electronic device 900 is located in close proximity. If the electronic device 900 is verified, a connection between the electronic devices may be established.

In another embodiment, the connection controller 950 may generate a response message including security information such as a set of facial features of a user of the other electronic device that transmits the connection request. The security information allows the other electronic device to verify whether the electronic device 900 is in close proximity to the other electronic device. In this embodiment, an image of the user of the other electronic device may be captured and a set of facial features of the user may be extracted.

The connection controller 950 may receive the extracted set of facial features and generate the response message including the set of facial features as security information. The response message is transmitted to the other electronic device via the communication unit 960. Upon receipt of the response message from the electronic device 900, the other electronic device may compare the received set of facial features and a stored set of reference facial features for its user. If the received set of facial features is indicative of the stored set of reference facial features, the other electronic device may verify that the electronic device 900 is in close proximity to the other electronic device and establish a connection with the electronic device 900.

Figure 10:
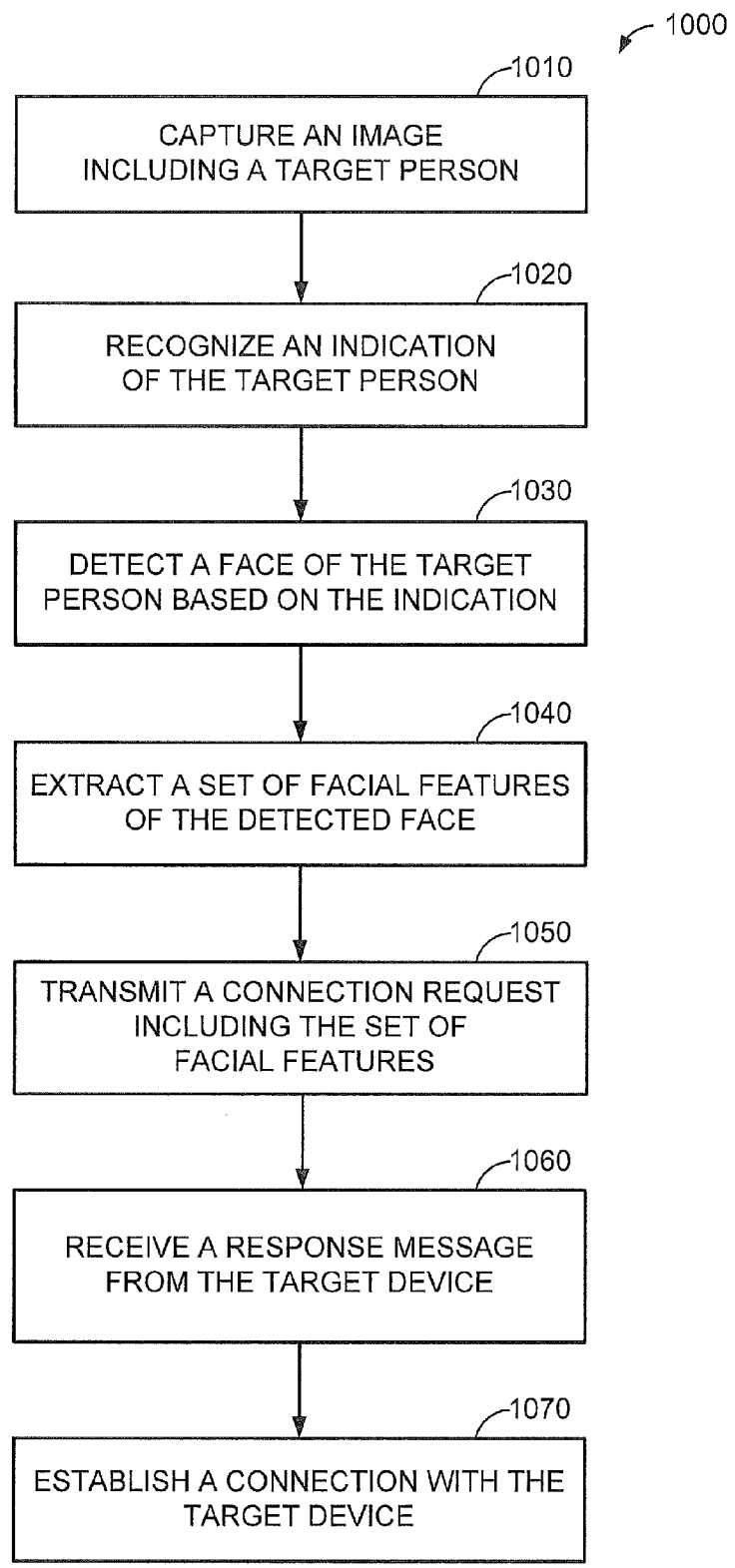
FIG. 10 illustrates a flowchart of a method, performed in an electronic device, for establishing a connection with a target device of a target person based on an indication of the target person, according to one embodiment of the present disclosure.

FIG. 10 illustrates a flowchart of a method 1000, performed in an electronic device, for establishing a connection with a target device of a target person based an indication of the target person, according to one embodiment of the present disclosure. At 1010, the electronic device (e.g., the electronic device 700 in FIG. 7) may capture an image including a person, who is selected as a target person by a user of the electronic device. To indicate the target person, the user may make a pointing gesture using a pointing object, speak a speech command, and/or input a command via an I/O unit of the electronic device. In the case of making a pointing gesture, the electronic device may capture the pointing gesture using a pointing object in an image. Additionally or alternatively, the electronic device may receive an input sound including the speech command from the user.

The electronic device recognizes an indication of the target person, at 1020. In one embodiment, the pointing object in the image may be recognized as the indication of the target person. Additionally or alternatively, the speech command may be recognized as the indication of the target person from the received input sound. In addition, the input command may be recognized as the indication of the target person. As such, the electronic device may recognize one or more indications of the target person.

A face of the target person is detected in the captured image based on the indication, at 1030. In this operation, one or more indications may be used for detecting the face of the target person. For example, both the pointing object and the speech command as indications may be used for detecting the face of the target person. A set of facial features of the target person is extracted from the detected face in the image, at 1040.

At 1050, the electronic device may transmit a connection request including the extracted set of facial features of the target person to other electronic devices including the target device by broadcasting or multicasting the connection request. The connection request may also include identification information of the electronic device such as a product identification number, a MAC address, an IP address, and the like. Upon receiving the connection request from the electronic device, the target device verifies whether the received set of facial features is indicative of a user of the target device (i.e., the target person), and if verified, responds to the connection request by transmitting a response message to the electronic device. The electronic device may receive the response message accepting the connection request from the target device, at 1060, and establishes a connection with the target device, at 1070.

Figure 11:
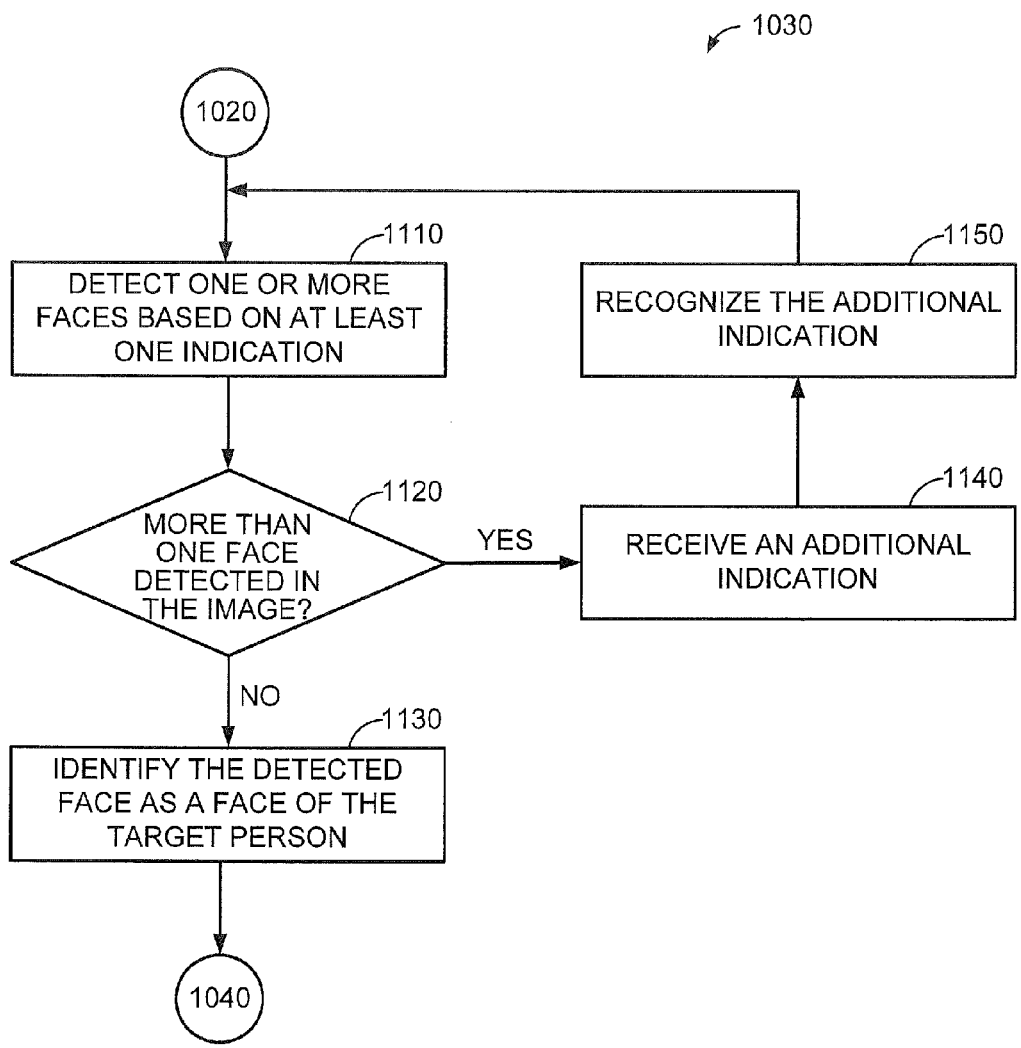
FIG. 11 illustrates a flowchart of a detailed method, performed in an electronic device, for detecting a face of a target person by requesting an additional indication, according to one embodiment of the present disclosure.

FIG. 11 illustrates a flowchart of a detailed method 1030, performed in the electronic device, for detecting the face of the target person by requesting an additional indication, according to one embodiment of the present disclosure. The electronic device may recognize at least one indication of the target person, at 1020, as described above with reference to FIG. 10. Based on the at least one indication of the target person, the electronic device may recognize one or more faces (or persons) in a captured image, at 1110.

At 1120, the electronic device may determine whether more than one face is detected in the image. If one face is detected (i.e., NO at 1120), the electronic device may identify the detected face as the face of the target person, at 1130, and the method 1030 proceeds to 1040 for extracting a set of facial features from the face of the target person. On the other hand, if more than one face is detected (i.e., YES at 1120), the electronic device may receive an additional indication for identifying the target person, at 1140, for example, by outputting a request to a user of the electronic device. The additional indication may include a pointing object, a speech command, and/or any other suitable input commands. In response to receiving the additional indication, the electronic device may recognize the additional indication, at 1150, and the method 1030 proceeds to 1110 for detecting one or more faces in the image based on the recognized additional indication.

Figure 12:
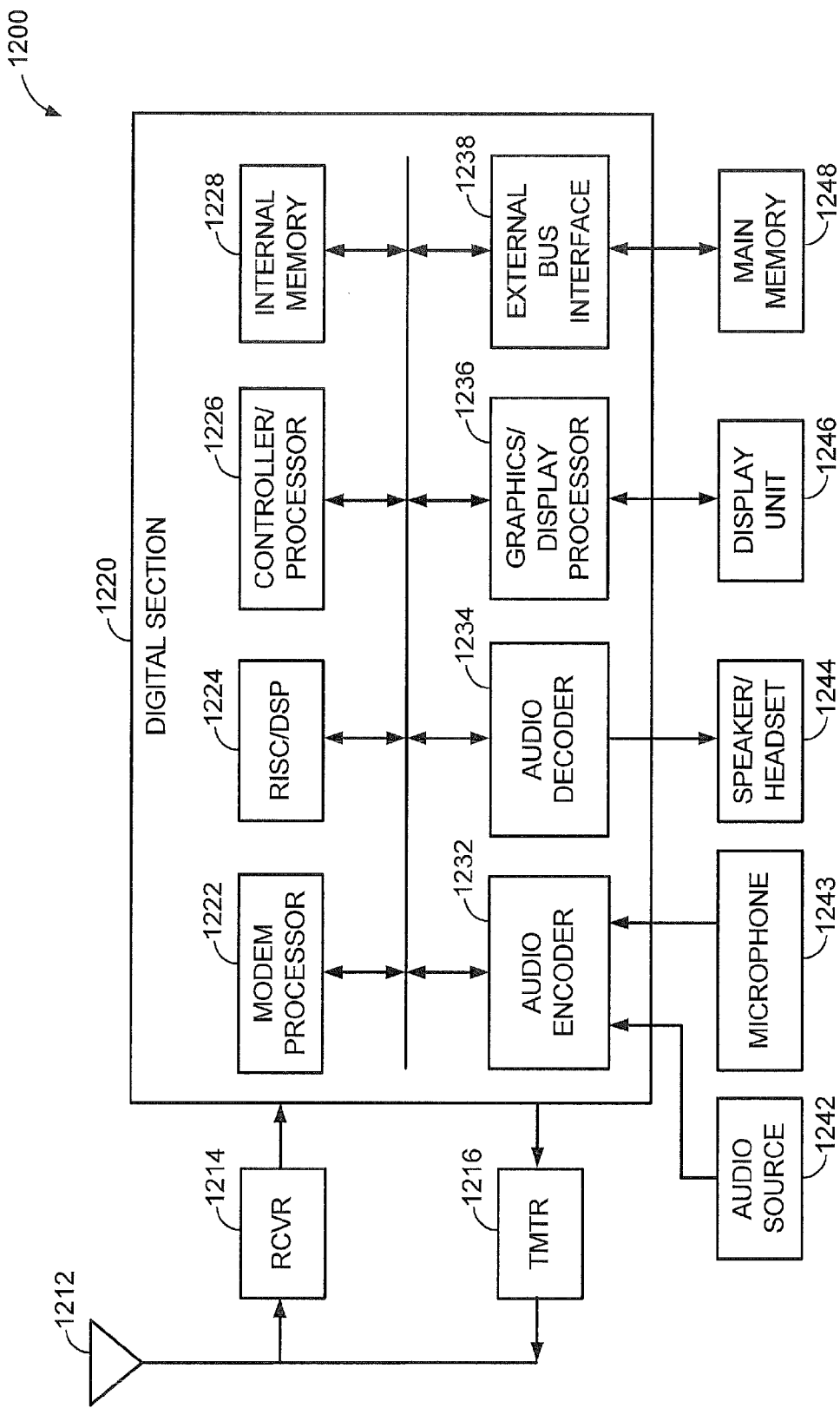
FIG. 12 is a block diagram of an exemplary electronic device in which the methods and apparatus for connecting to a target device are incorporated, according to one embodiment of the present disclosure.

FIG. 12 is a block diagram of an exemplary electronic device 1200 in which the methods and apparatus for connecting to a target device may be implemented, according one embodiment of the present disclosure. The configuration of the electronic device 1200 may be implemented in the electronic devices according to the above embodiments described with reference to FIGS. 1 to 11. The electronic device 1200 may be a cellular phone, a smartphone, a tablet computer, a laptop computer, a terminal, a handset, a personal digital assistant (PDA), a wireless modem, a cordless phone, glasses, etc. The wireless communication system may be a Code Division Multiple Access (CDMA) system, a Broadcast System for Mobile Communications (GSM) system, Wideband CDMA (WCDMA) system, Long Tern Evolution (LTE) system, LTE Advanced system, etc. Further, the electronic device 1200 may communicate directly with another mobile device, e.g., using Wi-Fi Direct or Bluetooth.

The electronic device 1200 is capable of providing bidirectional communication via a receive path and a transmit path. On the receive path, signals transmitted by base stations are received by an antenna 1212 and are provided to a receiver (RCVR) 1214. The receiver 1214 conditions and digitizes the received signal and provides samples such as the conditioned and digitized digital signal to a digital section for further processing. On the transmit path, a transmitter (TMTR) 1216 receives data to be transmitted from a digital section 1220, processes and conditions the data, and generates a modulated signal, which is transmitted via the antenna 1212 to the base stations. The receiver 1214 and the transmitter 1216 may be part of a transceiver that may support CDMA, GSM, LTE, LTE Advanced, etc.

The digital section 1220 includes various processing, interface, and memory units such as, for example, a modem processor 1222, a reduced instruction set computer/digital signal processor (RISC/DSP) 1224, a controller/processor 1226, an internal memory 1228, a generalized audio encoder 1232, a generalized audio decoder 1234, a graphics/display processor 1236, and an external bus interface (EBI) 1238. The modem processor 1222 may perform processing for data transmission and reception, e.g., encoding, modulation, demodulation, and decoding. The RISC/DSP 1224 may perform general and specialized processing for the electronic device 1200. The controller/processor 1226 may perform the operation of various processing and interface units within the digital section 1220. The internal memory 1228 may store data and/or instructions for various units within the digital section 1220.

The generalized audio encoder 1232 may perform encoding for input signals from an audio source 1242, a microphone 1243, etc. The generalized audio decoder 1234 may perform decoding for coded audio data and may provide output signals to a function determining engine 1244. The graphics/display processor 1236 may perform processing for graphics, videos, images, and texts, which may be presented to a display unit 1246. The EBI 1238 may facilitate transfer of data between the digital section 1220 and a main memory 1248.

The digital section 1220 may be implemented with one or more processors, DSPs, microprocessors, RISCs, etc. The digital section 1220 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, performed in an electronic device, for connecting to a target device, comprising:
    capturing an image including a pointing object and a face of a target person associated with the target device;
    recognizing an indication of the target person, wherein the indication corresponds to at least the pointing object in the captured image;
    detecting the face of the target person in the image based on the indication;
    extracting at least one facial feature of the face in the image; and
    connecting to the target device based on the at least one facial feature.

2. The method of claim 1, wherein recognizing the indication comprises detecting the pointing object in the image as the indication of the target person.

3. The method of claim 1, wherein recognizing the indication further comprises:
    receiving an input sound; and
    recognizing a speech command from the input sound as an additional indication of the target person.

4. The method of claim 1, wherein recognizing the indication further comprises receiving an input command as an additional indication of the target person.

5. The method of claim 1, wherein recognizing the indication further comprises:
    detecting the pointing object in the image as the indication of the target person; and recognizing a speech command from an input sound as an additional indication of the target person.

6. The method of claim 1, wherein detecting the face of the target person comprises:
receiving an additional indication to identify the target person if a plurality of faces are detected in the image; and
detecting the face of the target person based on the additional indication.

7. The method of claim 1, wherein connecting to the target device comprises:
transmitting a connection request including the at least one facial feature;
receiving, from the target device, a response message for connecting to the electronic device; and
establishing the connection with the target device based on the response message.

8. The method of claim 7, wherein the response message includes security information for verifying the target device, and
wherein establishing the connection with the target device comprises verifying the response message based on the security information.

9. The method of claim 8, wherein the security information includes at least one of environmental sound data captured by the target device and facial feature data of a user of the electronic device.

10. The method of claim 1, wherein connecting to the target device comprises:
transmitting a connection request including the at least one facial feature; and
establishing the connection with the target device based on whether a plurality of response messages is received for connecting to the electronic device.

11. An electronic device for connecting to a target device, comprising:
an image sensor configured to capture an image including a pointing object and a face of a target person associated with the target device;
a target identifying unit configured to extract at least one facial feature of the face in the image by recognizing an indication of the target person and detecting the face of the target person in the image based on the indication, wherein the target identifying unit comprises an object determining unit configured to detect the pointing object in the captured image as the indication of the target person; and
a connection controller configured to establish a connection to the target device based on the at least one facial feature.

12. The electronic device of claim 11, wherein the target identifying unit comprises a command identifying unit configured to recognize a speech command from an input sound as an additional indication of the target person.

13. The electronic device of claim 11, further comprising an input unit configured to receive an input command as an additional indication of the target person.

14. The electronic device of claim 11, wherein the target identifying unit is further configured to:
receive an additional indication to identify the target person if a plurality of faces are detected in the image; and
detect the face of the target person based on the additional indication.

15. The electronic device of claim 11, wherein the connection controller is further configured to:
transmit a connection request including the at least one facial feature;
receive, from the target device, a response message for connecting to the electronic device; and
establish the connection with the target device based on the response message.

16. The electronic device of claim 15, wherein the response message includes security information for verifying the target device, and
wherein the connection controller is further configured to verify the response message based on the security information.

17. The electronic device of claim 16, wherein the security information includes at least one of environmental sound data captured by the target device and facial feature data of a user of the electronic device.

18. The electronic device of claim 11, wherein the connection controller is further configured to:
transmit a connection request including the at least one facial feature; and
establish the connection with the target device based on whether a plurality of response messages is received for connecting to the electronic device.

19. A non-transitory computer-readable storage medium comprising instructions for connecting to a target device, the instructions causing a processor of an electronic device to perform the operations of:
capturing an image including a pointing object and a face of a target person associated with the target device;
recognizing an indication of the target person, wherein the indication corresponds to at least the pointing object in the captured image;
detecting the face of the target person in the image based on the indication;
extracting at least one facial feature of the face in the image; and
connecting to the target device based on the at least one facial feature.

20. The non-transitory computer-readable storage medium of claim 19, wherein recognizing the indication comprises detecting the pointing object in the image as the indication of the target person.

21. The non-transitory computer-readable storage medium of claim 19, wherein recognizing the indication further comprises:
receiving an input sound; and
recognizing a speech command from the input sound as an additional indication of the target person.

22. The non-transitory computer-readable storage medium of claim 19, wherein connecting to the target device comprises:
transmitting a connection request including the at least one facial feature;
receiving, from the target device, a response message for connecting to the electronic device; and
establishing the connection with the target device based on the response message.

23. The non-transitory computer-readable storage medium of claim 22, wherein the response message includes security information for verifying the target device, and
wherein establishing the connection with the target device comprises verifying the response message based on the security information.

24. An electronic device for connecting to a target device, comprising:
means for capturing an image including a pointing object and a face of a target person associated with the target device;

means for extracting at least one facial feature of the face in the image by recognizing an indication of the target person and detecting the face of the target person in the image based on the indication, wherein the means for extracting the at least one facial feature of the face comprises means for detecting the pointing object in the image as the indication of the target person; and means for establishing a connection to the target device based on the at least one facial feature.

25. The electronic device of claim 24, wherein the means for extracting the at least one facial feature of the face comprises means for recognizing a speech command from an input sound as an additional indication of the target person.

26. The electronic device of claim 24, wherein the means for establishing the connection to the target device is configured to:

transmit a connection request including the at least one facial feature;

receive, from the target device, a response message for connecting to the electronic device; and establish the connection with the target device based on the response message.

27. The electronic device of claim 26, wherein the response message includes security information for verifying the target device, and wherein the means for establishing the connection to the target device is further configured to verify the response message based on the security information.

28. The electronic device of claim 11, wherein the target identifying unit is further configured to request an additional indication for identifying the target person if the indication is not recognized.

* * * * *